Figure 1:
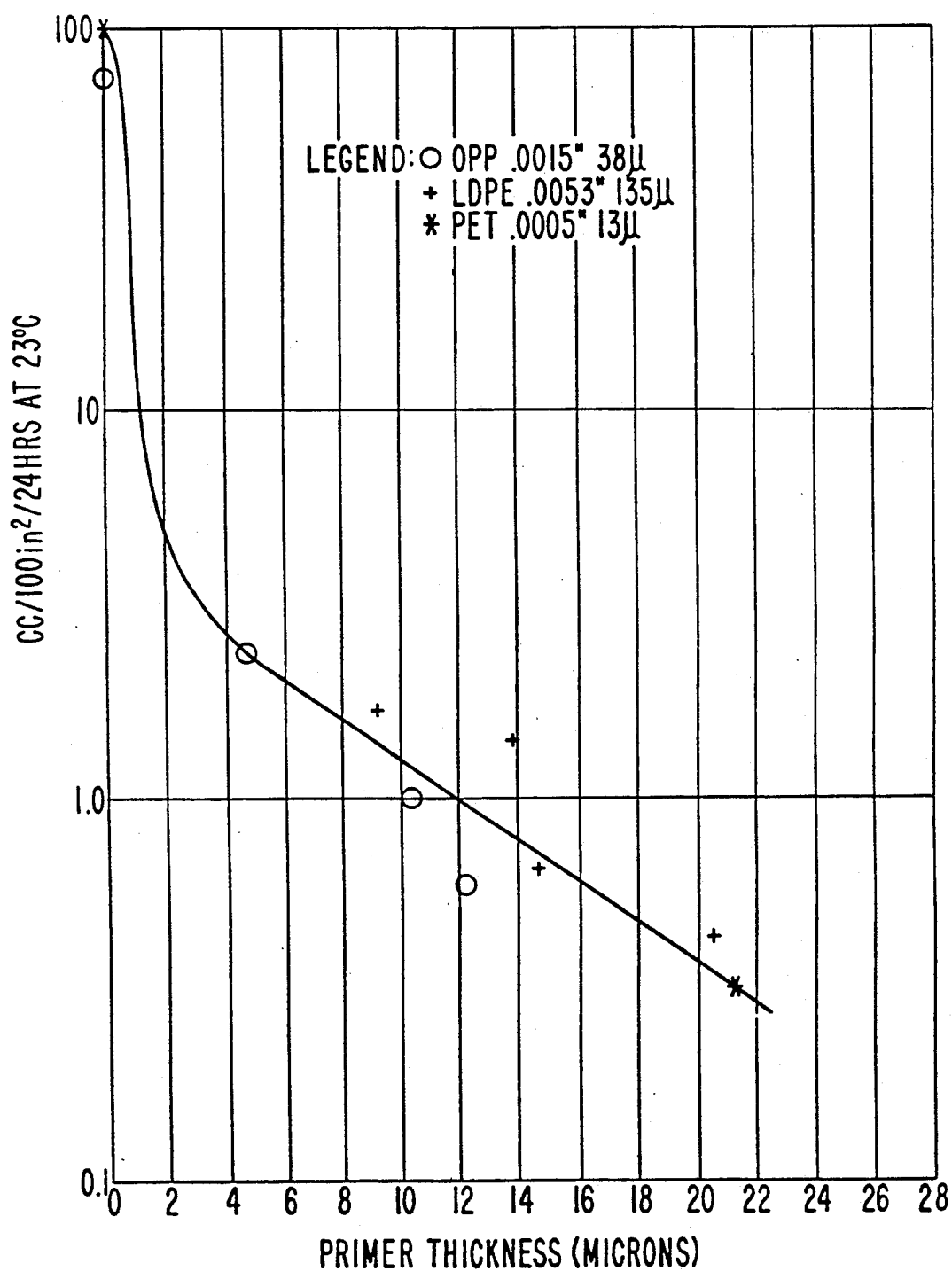

United States Patent [19]

Wyman

[11] Patent Number: 5,096,738
[45] Date of Patent: Mar. 17, 1992

[54] SILOXANE POLYMERS AND COPOLYMERS AS BARRIER, COATINGS AND METHOD OF PRODUCING BARRIER COATING PROPERTIES THEREWITH

[76] Inventor: John E. Wyman, 17 Monadnock Dr., Westford, Mass. 01886

[21] Appl. No.: 557,521

[22] Filed: Jul. 24, 1990

Related U.S. Application Data

[63] Continuation-in-part of Ser. No. 336,848, Apr. 12, 1989.

[51] Int. Cl.$^5$ .............................. B05D 3/06
[52] U.S. Cl. ........................ 427/44; 427/387; 427/393.4; 427/393.5; 428/339; 428/447; 428/451
[58] Field of Search ............ 427/44, 387, 393.5, 427/393.4; 428/447, 339, 451

[56] References Cited

U.S. PATENT DOCUMENTS

| | | | |
|---|---|---|---|
| 4,532,185 | 7/1985 | Balchunis et al. | 428/447 |
| 4,803,126 | 2/1989 | Wyman | 428/447 |

OTHER PUBLICATIONS

Plueddemann, Edwin P., "Silane Coupling Agents", 1982, pp. 207–232.

"Guide to Dow Corning Silane Coupling Agents", 1988, p. 21.

Watanabe, H., "The Use of High Barrier Packaging Films for Extending Shelf Life of Delicacies: Retortable and Microwaveable", Future-Pax 1988, Sixth International Ryder Conference on Packaging Innovations, Sep. 14–16, 1988, pp. 431–451.

*Primary Examiner*—Michael Lusignan
*Attorney, Agent, or Firm*—Rines and Rines, Shapiro and Shapiro

[57] ABSTRACT

A method of imubing polymer films as of polyethylene and polypropylene with gas, aroma, fragrance, flavor, grease and oil impermable surface characteristics involving coating the film with appropriate silane compounds and cross-linking the same while providing physical adsorption adherence to the film, and in sufficient coating micron thickness to produce gas and related barrier characteristics; with chemical grafting, including by eb techniques, further providing improved bonding. Preferred barrier-coated polymer films with reduced haze and clarity are formed by such method. The method is also useful to increase the barrier properties of organo-polymer films that already possess initial barrier characteristics.

18 Claims, 3 Drawing Sheets

SILOXANE POLYMERS AND COPOLYMERS AS BARRIER, COATINGS AND METHOD OF PRODUCING BARRIER COATING PROPERTIES THEREWITH

This application is a continuation-in-part of U.S. patent application Ser. No. 336,848, filed Apr. 12, 1989.

The present invention relates to novel barrier coatings and method for organic polymer films such as polyethylene and polypropylene films and the like, wherein the coated films become imbued with reduced permeability to gases, such as oxygen, air and carbon dioxide, as well as to greases and oils.

In my earlier U.S. Pat. No. 4,803,126 there is disclosed a successful technique for applying polymer coatings, such as latex polymers having the desired barrier properties, to the surface of a polyolefin film which had been treated with an organosilane primer coating, using electron beam radiation to graft the silane to the film and to bond the polymer coating to the crosslinked silane primer coating.

While earlier noted in preliminary private tests, it has now been surprisingly and repeatedly confirmed that appropriate silane primer coatings can provide remarkable barrier properties in and of themselves, and without additional coatings thereupon, to render the polymer film to which the coating has been applied strikingly less permeable to gases, such as oxygen, and to aroma and flavor transmission, and to such a degree of impermeability that the coated film is admirably useful for such purposes as food packaging and shelf life extension thereof and the like. In addition, improvement in the haze reduction, clarity and appearance of the film fortuitously concurrently occurs, matching the surface quality of high grade "Myler" film and the like, and also providing improved dielectric performance for electrical uses, as well, as in electrical capacitors, for example.

Underlying the invention, therefore, is the surprising discovery that appropriate polysiloxane coatings upon such polymer films as polyethylene and polypropylene can provide for greatly decreased permeability in the films to gases, including oxygen and carbon dioxide, and to oils and greases, as well—and all as distinguished from prior utilizations of silane material just to modify surfaces to improve adhesion or to couple polymers-to-polymers or to mineral fibers, as described in the publications referenced in my said patent, or to improve surface properties for bonding as in said patent. In "Silane Coupling Agents", by Edwin P. Plueddemann of Dow Corning Corporation (Plenum Press), 1982, for example, the use of silane primarily as a coupling agent in mineral filled organic resin composites and the like is taught in Chapter 8. The use of silane to couple thermoplastic polyolefins is suggested in the "Guide to Dow Corning Silane Coupling Agent", 1988, page 21.

The discovered remarkable oxygen barrier properties were not only totally unexpected from prior art experience with silane compounds, but in fact ran counter to prior expectations of those skilled in this art as to silane gas permeability. For example, it had been reported that the oxygen permeability of a silicon elastomer (a cross-linked polydimethylsiloxane) is a factor of about 80 times greater than that of a butyl rubber (a crosslinked polyisobutylene).

While thus useful to transform polymer films and the like that ordinarily do not have oxygen or related gas barrier properties to films that do have such properties, the invention has also been found to be extremely useful in providing a surprisingly high degree of improvement in oxygen barrier characteristics to current films of the type that already possess quite good oxygen barrier properties. The invention is therefore extremely useful also to upgrade the degree of oxygen barrier characteristics of present day or related oxygen barrier films, as well.

An object of the invention, therefore, is to provide new and improved barrier-coated polymer films and a method of producing the same, involving the use of appropriate coatings of polysiloxane, and preferably the grafting of the same to the film surface.

A further object is to provide food packaging materials of polysiloxane-coated polymer films with improved gas impermeability, reduced aroma and flavor transmission properties and improved surface appearance and clarity, as well.

An additional object of the invention is to improve significantly the oxygen or other barrier characteristics of organic or polymer films that already have excellent oxygen barrier properties.

Other and further objects will be explained hereinafter and are more particularly delineated in the appended claims.

In summary, the invention embodies a method of imbuing polymer films as of polyethylene and polypropylene with gas, aroma, fragrance, flavor, grease and oil impermeable surface characteristics involving coating the film with appropriate silane compounds and crosslinking the same while providing physical adsorption adherence to the film, and in sufficient coating micron thickness to produce gas and related barrier characteristics; with chemical grafting, including by eb techniques, further providing improved bonding. Preferred barrier-coated polymer films with reduced haze and clarity are formed by such method. Still further use of the invention resides in improving the barrier properties of organo-polymer films and materials that initially possess barrier characteristics. Preferred details and best mode embodiments are later presented.

Figure 2:
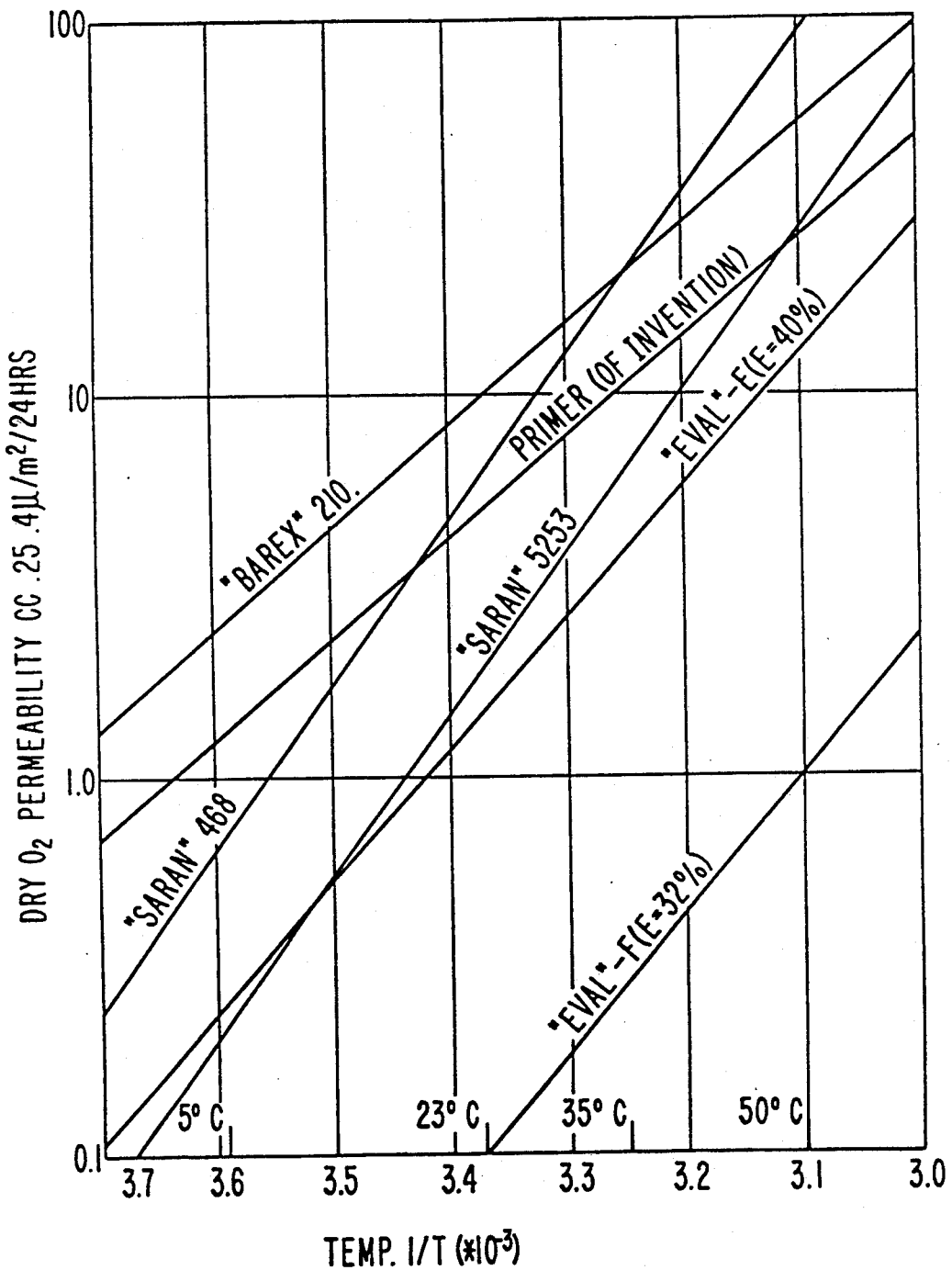
Figure 3A:
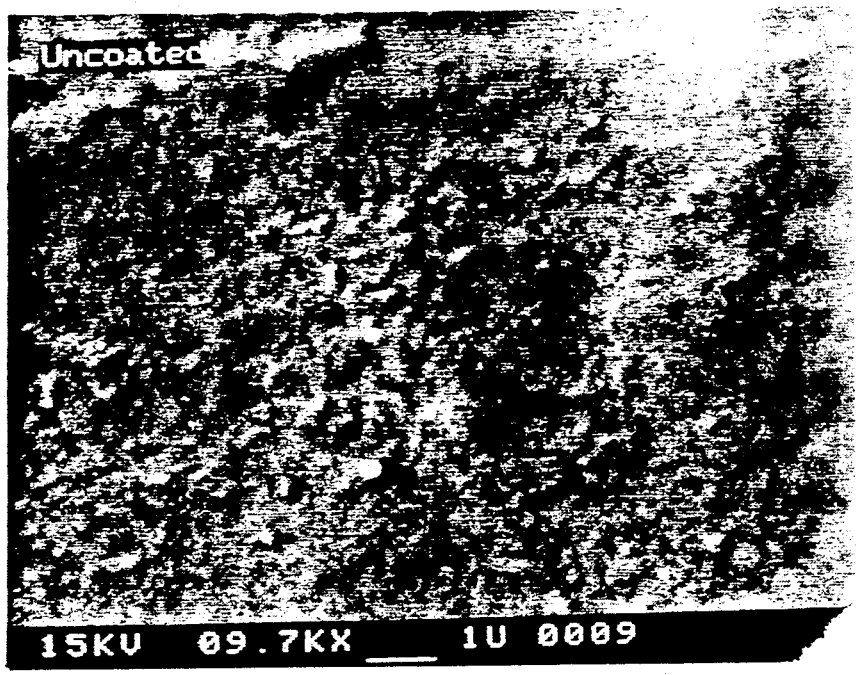
Figure 3B:
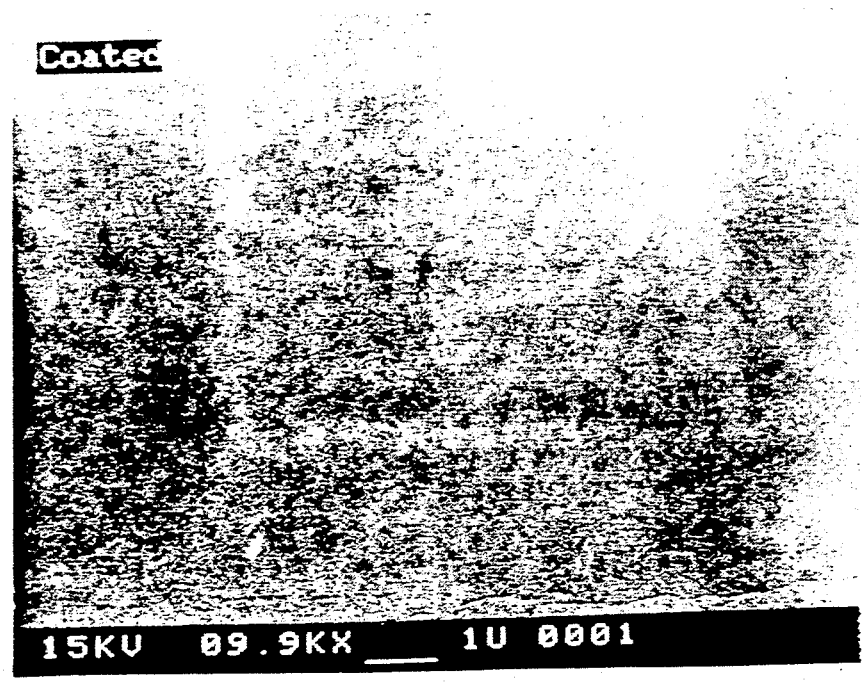

The invention will now be explained in connection with the accompanying drawings FIG. 1 of which is a graph plotting experimental results contrasting the permeability of polymer films to oxygen as a function of thickness of polysiloxane primer coating;

FIG. 2 contrasts the polysiloxane primer coating $O_2$-permeability characteristics as a function of temperature with present-day barrier films, the data as to the latter having been presented by H. Watanabe in "The Use of High Barrier Packaging Films, etc.", Future-Pax '88, Sixth International Ryder Conference on Packaging Innovations, Sept. 14–16, 1988; and FIGS. 3A and 3B are respectively scanning electron micrographs of the surface of polyethylene film prior and subsequent to coating with a siloxane coating of the invention.

METHOD OF PREPARATION

In accordance with the invention, the useful siloxane polymers are prepared by hydrolysis of silane monomers, and mixtures of monomers when a copolymer film is desired, in an aqueous alcohol solution. The mixture is allowed to stand for about 24 hours at 25 degrees C. to equilibrate the oligomeric siloxane structures, whereupon the alcohol solution containing the oligomeric siloxane structures is coated on the polymer film surface and is dried, preferably in a stream of warm air, to evaporate the alcohol and water to complete the formation of the Si-O-Si bonds of the polymer coating, highly cross-linking the same.

Optionally, but preferably, in order to improve adhesion and durability by providing chemical as well as physical bonding, the siloxane polymer may be grafted to the film surface when the siloxane polymer or copolymer contains a double bond, by using either a conventional promoted peroxide cure, (of course, added to the siloxane primer prior to coating on the polymer film surface), or by electron-beam initiated grafting as described in my said prior patent.

Corona treatment of the polyolefin film prior to the siloxane coating has been found to improve the coating adhesion, as later discussed. The further discovery of the necessary siloxane coating thickness ranges for effective gas barrier performance is also detailed hereinafter.

The structure of the silanes found useful in the practice of the present invention are shown below:

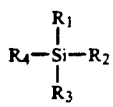

The grounds R1, R2, R3 and R4 may be the same or different and they are selected from the following groups:

1. Alkoxide groups, such as methoxy, ethoxy, propoxy, 2-methoxyethoxy, etc.;
2. Acid groups, such as acetoxy, propoxy, etc.;
3. Alkyl groups, such as methyl, ethyl, propyl, butyl, amyl, benzyl, cyclohexyl, and higher alkyl groups;
4. Aromatic groups, such as phenyl and alkylated phenyl groups, naphthyl, etc.;
5. Halogenated alkyl and aromatic groups, such as chloropropyl, 1,1,1-trifluoromethyl, trifluoropropyl, pentafluorophenyl, 3 -(heptafluoroisopropoxy)propyl, 1H, 1H, 2H,2H,perfluorodecyl, etc.;
6. Amine containing groups, such as 3-(2-aminoethylamino)propyl, gamma-aminopropyl, etc.;
7. Unsaturated groups such as allyl, gamma(methacryloxy) propyl, vinyl, gamma(acryloxy)propyl, 3-(2-vinylbenzylaminoethyl) propyl, etc.;
8. Epoxy containing groups such as 3-(2,3-epoxypropyloxy) propyl; and
9. Mercapto containing groups such as 3-mercaptopropyl.

The mechanism of gas permeation through a plastic film is a complex process involving adsorption on a surface migration through the bulk of the film through pores in the film, and desorption from the other side. While the total mechanism by which the siloxane polymers and copolymers of this invention improve the barrier properties of the plastic films on which they are deposited is not fully understood, and applicant does not wish to be bound by the following theoretical explanation (it being sufficient to teach how to obtain the results of the invention), it is believed that the siloxane polymers and copolymers of the invention wet the surface of the polymer film smoothly and uniformly and mostly fill in the openings of the pores on the surface of the film. This keeps the gas molecules out of the pores so that even though the pores are still there, the gas molecules cannot get into the pores to pass through the bulk of the film.

Evidence supporting this hypothesis is provided in the scanning electron micrographs of FIGS. 3A and 3B (10,000 magnification) which show respectively the coarse rough surface of the untreated low density polyethylene film (LDPE) 125 microns thick, and the leveled and smooth surface of the siloxane coated film (vinylbenzylamine silane, Dow Corning Z6032), approximately six microns thick. Further support is contained in the data of later-described Table 1 which shows the remarkable haze reduction (from 14.9% down to 2.5%) resulting from the smoothing and wetting of the film surface by the primer, which reduces the multiple light reflection and scatter.

It is also recognized that the more closely the chains of a polymer will pack together, the better will be the barrier properties. For example, in current-day packaging films sold under the trademark "SARAN" of the Dow Chemical Company, the chains of polyvinylidene chloride can pack together very closely and it has excellent barrier properties. Similarly, the molecular configuration of poly(ethylene-vinyl alcohol) is held very close together by hydrogen bonding between the hydroxyl groups on adjacent polymer chains and these copolymers have good barrier properties.

This close packing has the disadvantages, however, that the melt viscosity of these polymers is high and they must be extruded at high temperatures, which can lead to thermal decomposition. Generally, a comonomer is added during polymerization of polyvinylidene chloride which serves to disturb the close packing and lower the melt viscosity and allow extrusion at lower temperatures. Unfortunately, this also degrades the barrier properties as well, as shown in the "SARAN" curves of later-discussed FIG. 2.

In other present-day packaging films such as those of Northern Petrochemical Company, sold under the mark "EVAL", the ethylene units included in the ethylene-vinyl alcohol copolymer tend to lower the melt viscosity of the vinyl alcohol polymer and allow extrusion at temperatures below the decomposition temperature of the polyvinyl alcohol polymer. Increasing the ethylene content of the copolymer (the upper "EVAL" curve of FIG. 2, later discussed, wherein the ethylene content E is 40% as distinguished from the lower E=32% "EVAL" curve), also degrades the barrier performance of the vinyl alcohol polymer. This polymer also suffers from the disadvantages that it is hygroscopic; and water plasticizes the polymer and seriously degrades the performance of ethylene-vinyl alcohol polymers as barrier coatings.

Close packing of polymer chains to prevent gas and oil molecules from penetrating the polymer can also be achieved by crosslinking the polymer chains. However, highly crosslinked polymers are very rigid and extremely difficult to process by melt extrusion.

One of the advantages of the polymers and copolymers of the invention, on the other hand, is that the hydrolyzed oligomers are soluble in alcohol solution, so they are easily applied to the surface of the base film by a simple coating technique. The polymerization and cross-linking of the siloxane coating is completed by drying the coating, preferably at a slightly elevated temperature, to remove alcohol and water. The use of this alcohol technique enables the generation of a highly cross-linked film coating structure, and no high temperature extrusion is required. The degree of crosslinking is controlled by the monomers that are selected.

EXAMPLE 1

For example, hydrolyzed dimethyl dimethoxy silane will polymerize to a linear polymer. The length of the polymer chain can be controlled by copolymerizing with trimethyl methoxy silane. This compound has only one site which is reactive in the condensation polymerization and it will "cap" the growing polymer chain.

EXAMPLE 2

On the other hand, methyl trimethoxy silane has three reactive sites during the condensation polymerization and will crosslink between growing polymer chains as well as branch when it is cohydrolyzed with dimethyl dimethoxy silane.

EXAMPLE 3

Similarly, tetraethoxy silane has four reactive sites and will produce a very highly crosslinked polymer when it is included in the polymerization mixture.

In order to practice my invention, it is necessary to select a monomer mixture which, subsequent to hydrolysis and application to the film surface, will smoothly and uniformly wet the film surface. We have devised a test to select the siloxanes and mixtures of siloxanes which are useful in the practice of the invention.

TEST FOR USEFUL SILOXANE(S)

A 10 ml quantity of a silane or a mixture of silanes is dissolved in 90 ml of methyl alcohol and 1 ml of water is added and carefully mixed in. The solution is allowed to stand at about 25 degrees C. for 25 hours. A piece of test film, for example low density polyethylene film if the coating is to be used on polyolefin films, is immersed briefly in the methanol solution of the hydrolyzed silanes, and the alcohol is allowed to dry slowly in dry air. The coating is then warmed gently in a stream of air to complete the polymerization by driving off the water.

The silanes and mixtures of silanes that are useful in the practice of the present invention form a smooth and uniform coating on the surface of the organic film on which they are tested. These coatings also reduce the haze of the film.

The silanes and mixtures of silanes that are not useful in the practice of the invention have been found to form beads and droplets of siloxane on the surface of the film on which they are tested as the alcohol dries off the surface of the film and thus fail to wet the same. These materials thus do not form useful barrier coatings on organic polymer films.

It has been discovered that the silanes and silane mixtures that are useful in the practice of this invention, particularly on polyethylene and polypropylene films, generally contain a silane with an amino group.

EXAMPLE 4

For example, the vinylbenzylamine silane, Dow Corning Corp. Z-6032, when hydrolyzed in alcohol solution and applied to a polyethylene film surface, formed a smooth continuous film which was useful as both a barrier to oxygen and oil.

EXAMPLE 5

In contrast, gamma-methacryloxypropyl trimethoxy silane by itself when hydrolyzed in methanol solution and applied to a polyethylene film, formed beads of material which drew away from the film surface as the alcohol dried. This indicated that the siloxane oligomers did not wet the surface of the polyethylene film and were thus not useful as barrier coatings on polyethylene film.

An equal volume mixture of the gamma-methacryloxy propyl trimethoxy silane and vinyl benzyl amine silane (Dow Corning Z6032) hydrolyzed together in methanol solution and when applied to the polyethylene film surface was found, however, to dry out in the form of a smooth, uniform coating. This shows that the cohydrolyzed mixture is useful in the practice of the invention.

EXAMPLE 6

Similarly, hydrolyzed methyl trimethoxy silane in alcohol formed beads on the surface of the polyethylene film when the alcohol evaporated. However, when the methyl trimethoxy silane was cohydrolyzed with the said vinyl-benzyl amine silane and applied to the polyethylene film, a smooth uniform coating was obtained.

"WETTING"

The reason why an amine-containing silane will wet the surface of polyethylene film is not fully known. It may be due in part to a negative electrical surface charge on the surface or just under the surface of the film which attracts the cationic amine-containing siloxane when it is in methanol solution. It is also possible that the carboxyl groups on the film surface, particularly after it has been corona treated, attract the amine groups on the siloxane and cause it to wet the polyethylene film surface.

When mixtures of silanes which include an amino group containing silane are to be used as barrier polymers on polyethylene or polypropylene film, it has been found that the monomers should be mixed and then cohydrolyzed in order that the resulting oligomers will wet the surface.

Thus, a mixture of equal volumes of the vinyl benzyl amine silane and the methacryloxypropyl silane hydrolyzed separately, was found to form beads on the surface of the polyethylene film as the alcohol solution evaporated.

EXAMPLE 7

Similarly, a mixture of 9 parts of methyl trimethoxy silane and one part of the vinyl benzyl amine silane that had been cohydrolyzed in methanol formed a smooth, uniform coating on the surface of the polyethylene film.

In contrast, a mixture of equal parts of methanol solutions of the vinyl benzyl amine silane and the methyl trimethoxy silane that had been separately hydrolyzed, formed beads of material on the polyethylene as the alcohol evaporated from the mixture after it was coated on the polymer surface.

EXAMPLE 8

A 10 ml quantity of gamma aminopropyl triethoxy silane was dissolved in 90 ml of methyl alcohol and one ml of water was added and carefully mixed in. The solution was allowed to stand for about 24 hours at about 25 degrees C. A piece of polyethylene film was briefly immersed in the solution and allowed to dry slowly in dry air. The coating was warmed gently in a stream of warm air to complete the polymerization. A smooth, uniform coating was formed on the polyethylene film surface.

EXAMPLE 9

A mixture of 2 ml of gamma-aminopropyl tri-ethoxy silane and 8 ml of vinyl triethoxy silane was dissolved in 90 ml of methanol and 1 ml of water was added and carefully mixed in. The solution was allowed to stand for 24 hours at 25 degrees C.

A piece of polyethylene film was immersed in the solution and allowed to dry slowly in dry air. The coating was warmed gently in a stream of warm air to complete the polymerization. A smooth, uniform coating was formed on the polyethylene film surface.

EXAMPLE 10

A mixture of 2 ml of gamma-aminopropyl tri-ethoxy silane and 2 ml of methyl triethoxy silane was dissolved in 90 ml of methanol and 1 ml of water was added and carefully mixed in. The solution was allowed to stand for 24 hours at 25 degrees C.

A piece of polyethylene film was immersed in the solution and allowed to dry slowly in dry air. The coating was warmed gently in a stream of air to complete the polymerization. A smooth, uniform coating was formed on the polyethylene film surface.

It has been discovered, furthermore, that the coating phenomenon herein described is generally a surface-coating effect. Cross-sectional analysis of the LDPE coated film, for example, by scanning electron microscopy and electron-dispersive X-ray spectroscopy has revealed the few micron coating to be attached to the film surface with no apparent penetration into the film.

The surface and barrier properties of the barrier coating are controlled by the nature of the monomers that are used to form the oligomers. For example, the critical surface tension of the polyethylene film that has been coated with hydrolyzed vinyl benzyl amine silane is about 55 dynes/cm. In contrast, the critical surface tension of the coating on polyethylene film which was prepared by hydrolyzing a mixture of 9 parts of methyl trimethoxy silane and one part of the vinyl benzyl amine silane is only about 23 dynes/cm. A drop of hydrocarbon oil on the coated surface has a large contact angle and did not spread. In contrast, the oil spread slowly and wet the surface of the uncoated film.

If it is desired to reduce the sensitivity of the coating to moisture, as another example, one may cohydrolyze the vinyl benzyl amine silane with an alkyl trimethoxy silane in order to replace some of the amine and amine salt groups that are hydroscopic. Similar tailoring of the selected silane compounds for desired properties can be obtained with appropriate silane selections.

The adhesion of the coating on the film can be improved by incorporating monomers with vinyl unsaturation into the siloxane mixture before hydrolysis and grafting the resulting coating to the film surface. The grafting can be accomplished by incorporating a conventional promoted free radical generator in the coating (such as dicumyl peroxide, for example) that will react upon gentle heating, or by use of electron beam-initiated grafting, as described in my said patent, subsequent to drying of the coating.

The improved adhesion of the barrier coating to the substrate may, as before explained, be achieved by grafting the siloxane coating to the film. In the case of a barrier coating of a vinyl benzyl amine siloxane on a polypropylene substrate, the "Scotch tape test" (described in my said prior patent) removed some of the ungrafted coating from the polypropylene, but did not remove any of the grafted coating. This experiment demonstrates the greatly improved adhesion of the coating to the substrate that can be achieved by eb grafting.

The graph of the before-mentioned FIG. 1, demonstrates the efficiency of siloxane coatings applied to polymer films in accordance with the invention, plotting $O_2$ permeability in cc/100 in$^2$/24 hours at 23° C. along the ordinate, and siloxane primer thickness in microns along the abscissa for 38 micron oriented polypropylene (OPP), 135 micron low density polyethylene film (LDPE) and 13 micron polyester (PET), with and without a coating derived from hydrolyzed 60% methanol and 40% Dow Corning Z-6032 silane, prepared as above-described and applied in various thicknesses to the film and electron-beam grafted with about 175 KV and does up to 5 Megarads as detailed in my prior patent. The uncoated films were quite permeable (approximately 70-95 cc/100 in$^2$/24 hours); whereas coatings of from 5 to 22 microns provided excellent $O_2$-permeable barriers under approximately 2.5–0.5 cc/100 in$^2$/24 hours at one atmosphere of pressure. Each of these coated films provided low haze appearance as well, and outstanding aroma or fragrance retention of products packaged therewith as later described in connection with the Limonene Transmissions tests of Table 2; the coated films have apparently reduced solubility of aroma and flavor compounds in such packaged food or other products—so-called "scalping" of such.

Gas permeability under 1 cc/100 in$^2$/24 hours at room temperature and one atmosphere was realized with primer thicknesses of the order of 10 microns. Thickness of a few microns thus provides a dramatic improvement in barrier properties. Equally impressive enhancement of oil resistance of the polyolefins has also been demonstrated by the process.

Favorable comparison of the above siloxane primer barrier system ("PRIMER") with present-day commercial food-packaging and similar film materials in terms of $O_2$ permeability as a function of increasing temperature, is presented in the before-mentioned FIG. 2. It will be observed that the slope or temperature coefficient of the "PRIMER" curve is more favorable than for the DOW films known as "SARAN" (polyvinylidene chloride), and the films known as "EVAL" (Northern Petrochemical Company—ethylene vinyl alcohol), and at least comparable to "BAREX" film.

The improvement in the before-mentioned haze appearance is shown in the following Table 1, attained for the LDPE film with 5 micron siloxane primer bilaterally applied; and the marked improvement in Limonene Transmission for both the coated LDPE and OPP films is presented in Table 2.

TABLE 1

| HAZE MEASUREMENTS - LDPE 135 MICRON FILM: 5 MICRON PRIMER BILATERAL ASTM TEST METHOD D-1003 | | |
|---|---|---|
| SAMPLE | TRANSMITTANCE % | HAZE % |
| VIRGIN FILM | 88.8 | 14.9 |
| PRIMED FILM | 88.9 | 2.5 |

TABLE 2

LIMONENE TRANSMISSION - LDPE/OPP
ASTM TEST METHOD D-1653
(75° F. - 35% R.H.)

| SAMPLE | THICKNESS | LOSS (MG/100 IN²/24 HOURS) | NORMALIZED |
|---|---|---|---|
| VIRGIN LDPE | 135 MICRON | 8014.9 | 100.0 |
| PRIMED LDPE | APPROX. 145 MICRON | 6.0 | .07 |
| VIRGIN OPP | 50 MICRON | 3359.6 | 100.0 |
| PRIMED OPP | APPROX. 60 MICRON | 31.8 | .94 |

The Limonene Transmission test (D-1653) is an accepted measure of aroma or fragrance or flavor transmission as used in the food-packaging industry, involving gas chromatograph measurement of limonene solubility in the film. Table 2 demonstrates that for the LDPE film with the siloxane coating above described, the limonene loss was only 6 mg/100 in²/24 hours as contrasted with the more than thousand times greater loss (8014.9) for the uncoated or virgin LDPE. Similar tremendous fragrance retention was achieved with the coated OPP film.

As before stated, the invention is also useful to upgrade or improve the barrier characteristics of films or materials that already have barrier characteristics. The convention oxygen barrier polymer films include the ethylene vinyl alcohol copolymer (EVOH), polyvinylidene dichloride copolymers (PVDC), acrylonitrile (AN) copolymer films and amorphous nylon barrier films (MXD) and the like. Such materials are considered to be the standard oxygen and other barrier materials.

It has been discovered, for example, that a polysiloxane coating approximately 5-6 microns thick on either side will significantly improve the oxygen barrier properties of the above-described recognized barrier materials EVOH and PVDC, as well as the acrylonitrile copolymer films. This improvement is about 2 orders of magnitude reduction in oxygen permeability in such known barrier materials.

For such uses, the invention is practiced in a manner similar to that earlier discussed. The siloxane coating solution is prepared in alcohol by the following technique: 50 milliliters of the Dow-Corning Z6032 (40% vinyl benzyl siloxane and alcohol), for example, is placed in a container and 42.5 milliliters of methyl alcohol is added followed by 7.5 milliliters of water. The mixture is stirred until it becomes clear, then it is allowed to stand for 24 hours at 20°-25° C. temperature to allow the hydrolysis to become complete and the silanols to equilibrate. The barrier coating films, such as the ethylene vinyl alcohol, polyvinylidene dichloride, the acrylonitrile copolymer film and the amorphous nylon film are prepared for coating by corona treatment on both sides. This serves to clean the film and partially to oxyidize the surface, thereby improving the wettability of the film. The corona-treated films are then dipped briefly into the hydrolized siloxane coating solution as described above, allowed to drain and dried to a tack-free state in a stream of warm air. The dried films are then preferably treated with an electron beam at 165 kilovolts with a total dose of 2.5 to 3 megarads bilateral treatment.

The substantial improvement in the barrier properties is demonstrated by measuring the oxygen permeability of the uncoated film and comparing it with the oxygen permeability of the film which has been coated by the practice of the invention. In all cases, about 2 order of magnitude improvement in oxygen barrier properties is achieved. The ethylene vinyl alcohol film can range in thickness from 15 microns to about 60 microns; the thickness of the polyvinylidene dichloride film can range from 12 microns to about 25 microns; the acrylonitrile copolymer film can vary from 25 to 50 microns and the thickness of the amorphous nylon can vary from about 10 to about 60 microns.

While the above examples have been principally carried out with methanol, selected because of its ease of use and relatively low boiling point and because it is an excellent solvent for both silanes and water, other solvents miscible with water and of high vapor pressure for evaporation and that can dissolve a wide range of silanes may also be used, including other alcohols such as ethanol and isopropyl alcohol. Further modifications will occur to those skilled in this art and such are considered to fall within the spirit and scope of the invention as defined in the appended claims.

What is claimed is:

1. A method of improving the impermeability of gas, aroma, flavor, fragrance, and/or oil impermeable organic polymer films that comprises hydrolyzing silane monomers or mixtures of silane monomers in an aqueous alcohol solution and equilibrating the same; coating the same upon a said polymer film; evaporating the alcohol and water to complete the formation of silicon-oxygen-silicon bonds and to cross-link the silane(s), thereby to produce a siloxane gas-impermeable barrier coating adhered to the surface(s) of the film, and chemically grafting the siloxane coating to the film.

2. An improved gas impermeable oxygen barrier characteristic polymer film constituted of an organic oxygen barrier polymer film base to one or both surfaces of which is physically adsorbed a cross-linked siloxane non-electrically conductive coating that imbues the said surface(s) with improved gas, aroma, flavor, fragrance and grease and oil-impermeable surface characteristics, and in which said coating is produced by the method of claim 1.

3. A method as claimed in claim 1 and in which the grafting is effected with electron beam radiation.

4. A method as claimed in claim 1 or 3 in which the alcohol is methanol and the silane(s) are represented by the following formula:

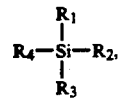

where the groups R1, R2, R3 and R4 may be the same or different and are selected from the following groups:
1. Alkoxide groups, such as methoxy, ethoxy, propoxy, 2-methoxyethoxy, etc.;
2. Acid groups, such as acetoxy, propoxy, etc.;
3. Alkyl groups, such as methyl, ethyl, propyl, butyl, amyl, benzyl, cyclohexyl, and higher alkyl groups;
4. Aromatic groups, such s phenyl and alkylated phenyl groups, naphthyl, etc.;
5. Halogenated alkyl and aromatic groups, such as chloropropyl, 1,1,1-trifluoromethyl, trifluoropropyl, pentafluorophenyl, 3-(heptafluoroisopropoxy)propyl, 1H, 1H, 2H, 2H, perfluorodecyl, etc.;

6. Amine containing groups, such as 3-(2-aminoethylamino)propyl, gamma-aminopropyl, etc.;

7. Unsaturated groups such as ally, gamma(methacryloxy) propyl, vinyl, gamma(acryloxy)propyl, 3-(2-vinylbenzylaminoethyl) propyl, etc.;

8. Epoxy containing groups such as 3-(2,3-epoxypropyloxy) propyl; and

9. Mercapto containing groups such as 3-mercaptopropyl.

5. A method as claimed in claim 1 and in which the silane comprises a vinyl benzyl amine silane.

6. A method as claimed in claim 5 and in which the vinyl benzyl amine silane is cohydrolyzed with methyl trimethoxy silane.

7. A method as claimed in claim 6 and in which the ratios of said silanes by volume range from about 9 to 1.

8. A method as claimed in claim 1 and in which the silane comprises gamma aminopropyl triethoxysilane.

9. A method as claimed in claim 1 and in which the siloxane coating is applied in a thickness of the order of a few microns.

10. A method as claimed in claim 9 and in which the said thickness lies within the range of from about 5 to 22 microns.

11. A method as claimed in claim 1 and in which the grafting is effected by peroxide cure.

12. A polymer film constituted of an organic polymer film base to a surface of which is physically adsorbed a cross-linked siloxane non-electrically conductive coating that imbues the said surface with gas, aroma, flavor and fragrance and grease and oil impermeable surface characteristics, wherein the organic film base is selected from the group consisting of polyethylene, polypropylene, polyester, polyvinylidene dichloride, ethylene vinyl alcohol, acrylonitrile polymers and amorphous nylon, and wherein said coating is produced by a method comprising hydrolyzing silane monomers or mixtures of silane monomers in an aqueous alcohol solution and equilibrating the same, coating the same upon the organic film base, evaporating the alcohol and water to complete the formation of silicon-oxygen-silicon bonds and to cross-link the silane(s), thereby to produce a siloxane gas-impermeable barrier coating adhered to the surface of the organic film base, and chemically grafting said siloxane coating to the organic film base.

13. A polymer film as claimed in claim 12 and in which the said coating is of thickness in the range of about 5 to 22 microns.

14. A polymer film as claimed in claim 12 and in which the said coating imparts haze-reduction characteristics and clarity.

15. A polymer film as claimed in claim 12 and in which the silane precursor of the siloxane comprises a vinyl benzyl amine silane.

16. A polymer film as claimed in claim 15 and in which the vinyl benzyl amine silane is cohydrolyzed with methyl trimethoxy silane.

17. A polymer film as claimed in claim 16 and in which the ratios of said silanes by volume range from about 9 to 1.

18. A polymer film as claimed in claim 12 and in which the silane precursor of the siloxane comprises gamma aminopropyltriethoxy silane.

* * * * *